United States Patent
Merched et al.

(10) Patent No.: US 7,424,062 B2
(45) Date of Patent: Sep. 9, 2008

(54) EFFICIENT DOPPLER COMPENSATION METHOD AND RECEIVER FOR ORTHOGONAL-FREQUENCY-DIVISION-MULTIPLEXING (OFDM) SYSTEMS

(75) Inventors: Ricardo Merched, Rio de Janeiro (BR); Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 313 days.

(21) Appl. No.: 11/471,253

(22) Filed: Jun. 20, 2006

(65) Prior Publication Data

US 2007/0293256 A1 Dec. 20, 2007

(51) Int. Cl.
*H04K 1/10* (2006.01)
(52) U.S. Cl. .................................... 375/260
(58) Field of Classification Search ............... 375/259, 375/260, 263, 267, 229–236; 333/18, 28 R; 708/300, 322, 323; 379/340, 398; 455/504, 455/67.11, 63.1
See application file for complete search history.

(56) References Cited

U.S. PATENT DOCUMENTS

2005/0026565 A1* 2/2005 Goldstein et al. ......... 455/67.11
2005/0265467 A1 12/2005 Dabak et al.

OTHER PUBLICATIONS

Bai et al. An Equalization Method for OFDM in Time Varying Multipath Channels, IEEE, 2004, p. 1740-1743.*

Nakamura et al. New Estimation and Equalization Approach for OFDM under Doppler-Spread Channel, IEEE, 2002, p. 555-560.*
Wooding, R., "The Multivariate Distribution of Complex Normal Variables," Biometrika, vol. 43, Parts 1 and 2, Issued, Jun. 1956, pp. 212-215.
Armstrong, J., "Analysis of New and Existing Methods of Reducing Intercarrier Interference Due to Carrier Frequency Offset in OFDM," IEEE Transactions on Communications, vol. 47, No. 3, Mar. 1999, pp. 365-369.
Scaglione, A., et al., "Redundant Filterbank Precoders and Equalizers Part I: Unification and Optimal Designs," IEEE Transactions on Signal Processing, vol. 47, No. 7, Jul. 1999, pp. 1989-2006.
Dong, X., et al., "Symbol Error Probability of Two-Dimensional Signaling in Ricean Fading With Imperfect Channel Estimation," IEEE Transactions on Vehicular Technology, vol. 54, No. 2, Mar. 2005, pp. 538-549.

(Continued)

*Primary Examiner*—Sam K Ahn
(74) *Attorney, Agent, or Firm*—Mohammad S. Rahman, Esq.; Gibb & Rahman, LLC

(57) ABSTRACT

A receiver and method of enhancing transmitted data signals in a wireless communications system includes wirelessly transmitting and receiving a data signal over a wireless channel in the communications system; providing known channel parameters corresponding to the wireless channel; expressing the data signal as an input data vector; replacing indexes in the input data vector having a magnitude greater than one into indexes in the input data vector having a unit norm; creating an output data vector; and calculating a dot product of (i) the input data vector comprising replaced indexes; and (ii) the output data vector, wherein the calculating process equalizes the data signal received by a receiver in the presence of Doppler frequency shifts of the data signal.

20 Claims, 9 Drawing Sheets

OTHER PUBLICATIONS

Zhao, Y., et al., "Intercarrier Interference Self-Cancellation Scheme for OFDM Moible Communication Systems," IEEE Transactions on Communications, vol. 49, No. 7, Jul. 2001, pp. 1185-1191.

Gorokhov, A., et al., "Robust OFDM Receivers for Dispersive Time-Varying Channels: Equalization and Channel Acquisition," IEEE Transactions on Communications, vol. 52, No. 4, Apr. 2004, pp. 572-583.

Pham-Gia, T., et al., "Density of the Ratio of Two Normal Random Variables," Communications in Statistics: Theory and Methods, vol. 35, Issue 9, 2006.

Kaleh, G., "Channel Equalization for Block Transmission Systems," IEEE Journal on Selected Areas in Communications, vol. 13, No. 1, Jan. 1995, pp. 110-121.

Muquet, B., et al., "Cyclic Prefixing or Zero Padding for Wireless Multicarrier Transmissions?," IEEE Transactions on Communications, vol. 50, No. 12, Dec. 2002, pp. 2136-2148.

Vorobyov, S., et al., "Robust Iterative Fitting of Multilinear Models," IEEE Transactions on Signal Processing, vol. 53, No. 8, Aug. 2005, pp. 2678-2689.

Tureli, U., et al., "OFDM Blind Carrier Offset Estimation: ESPRIT," IEEE Transactions on Communications, vol. 48, No. 9, Sep. 2000, pp. 1459-1461.

* cited by examiner

EFFICIENT DOPPLER COMPENSATION METHOD AND RECEIVER FOR ORTHOGONAL-FREQUENCY-DIVISION-MULTIPLEXING (OFDM) SYSTEMS

BACKGROUND

1. Technical Field

The embodiments herein generally relate to wireless communications systems, and, more particularly, to orthogonal-frequency-division-multiplexing (OFDM) systems.

2. Description of the Related Art

OFDM is a signal modulation technique used in wireless communications systems to transmit large amounts of digital data over a wireless channel and to reduce data interference caused by the wireless channel. In typical OFDM systems, a data signal is partitioned into multiple, smaller sub-signals, each of which is transmitted from a transmitter to a receiver over a different frequency and broadcast in all directions. The transmitted data signals typically reflect off objects in the environment, and may reach the receiver via different propagation paths.

Wireless communication systems that use OFDM may be categorized into linear, time-invariant (LTI) systems and linear, time-variant (LTV) systems. In LTI systems, channel conditions (for example, the strength of each propagation path) do not substantially vary with time, such as when a transmitter and receiver are stationary. Moreover, because channel conditions do not substantially vary, the receiver may use information pertaining to the channel conditions to easily extract desirable data from a received signal and to discard extraneous, undesirable data and/or effects imposed upon the signal by the wireless channel.

However, in LTV systems, substantially high Doppler conditions may exist (for example, where the distance between the transmitter and receiver varies at speeds of 200-300 km per hour). Accordingly, channel conditions (for example, the strength of each propagation path) may vary with time. Generally, these variations are caused by multiple signal reflections that are out of phase with respect to one another. Furthermore, because these rapid variations often occur faster than the rate at which the receiver can properly receive the data signals, the receiver may not be able to accurately account for these variations, which could result in interference between data on different frequency sub-carrier signals. This is often referred to as intercarrier interference (ICI).

Carrier-offset and the Doppler effect resulting from a dispersive time varying channel model represent two distinct sources of leakage in OFDM systems, which destroy the desired orthogonality among the corresponding subchannels. This gives rise to ICI whose effect must either be compensated or cancelled prior to detection. Accordingly, there remains a need for an equalization technique for OFDM receivers in the presence of ICI.

SUMMARY

In view of the foregoing, the embodiments herein provide a method of enhancing transmitted data signals in a wireless communications system and a program storage device readable by computer, tangibly embodying a program of instructions executable by the computer to perform the method of enhancing transmitted data signals in a wireless communications system, wherein the method comprises wirelessly transmitting and receiving a data signal over a wireless channel in the communications system; providing known channel parameters corresponding to the wireless channel; expressing the data signal as an input data vector; replacing indexes in the input vector having a magnitude greater than one into indexes in the input data vector having a unit norm; creating an output data vector; and calculating a dot product of (i) the input data vector comprising replaced indexes; and (ii) the output data vector, wherein the calculating process equalizes the data signal received by a receiver in the presence of Doppler frequency shifts of the data signal.

Preferably, the expressing process comprises expressing the known channel parameters as a first data vector and a second data vector; and setting the input data vector as a ratio of the first data vector to the second data vector. Moreover, the method may further comprise calculating a ratio of the data product and the first data vector in order to estimate a quality of the transmitted data signal, wherein the quality of the transmitted data signal may comprise a reduced signal to noise ratio in the transmitted data signal. Additionally, the calculating process may comprise performing a fast fourier transform (FFT) of an inverse fast fourier transform (IFFT) of the dot product. The method may further comprise removing ICI from the data signal. Furthermore, the wireless communications system may comprise an OFDM system.

Another embodiment herein provides a receiver adapted to enhance transmitted data signals, wherein the receiver comprises a first logic component adapted to receive a data signal over a wireless channel in a wireless OFDM communications system, wherein the wireless channel comprises channel parameters that are known at the time of reception of the data signal; and a second logic component coupled to the first logic component and adapted to equalize the data signal received by the first logic component in the presence of Doppler frequency shifts of the data signal, wherein the equalizing of the data signal occurs by expressing the data signal as an input data vector; replacing indexes in the input data vector having a magnitude greater than one into indexes in the input data vector having a unit norm; creating an output data vector; and calculating a dot product of (i) the input data vector comprising replaced indexes; and (ii) the output data vector.

Preferably, in the equalizing of the data signal, the expressing process comprises expressing the known channel parameters as a first data vector and a second data vector; and setting the input data vector as a ratio of the first data vector to the second data vector. Preferably, the equalizing of the data signal further occurs by calculating a ratio of the dot product and the first data vector in order to estimate a quality of the transmitted data signal. Additionally, the quality of the transmitted data signal may comprise a reduced signal to noise ratio in the transmitted data signal. Furthermore, in the equalizing of the data signal, the calculating process preferably comprises performing a FFT of an IFFT of the dot product. Moreover, the second logic component may be adapted to remove ICI from the data signal.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
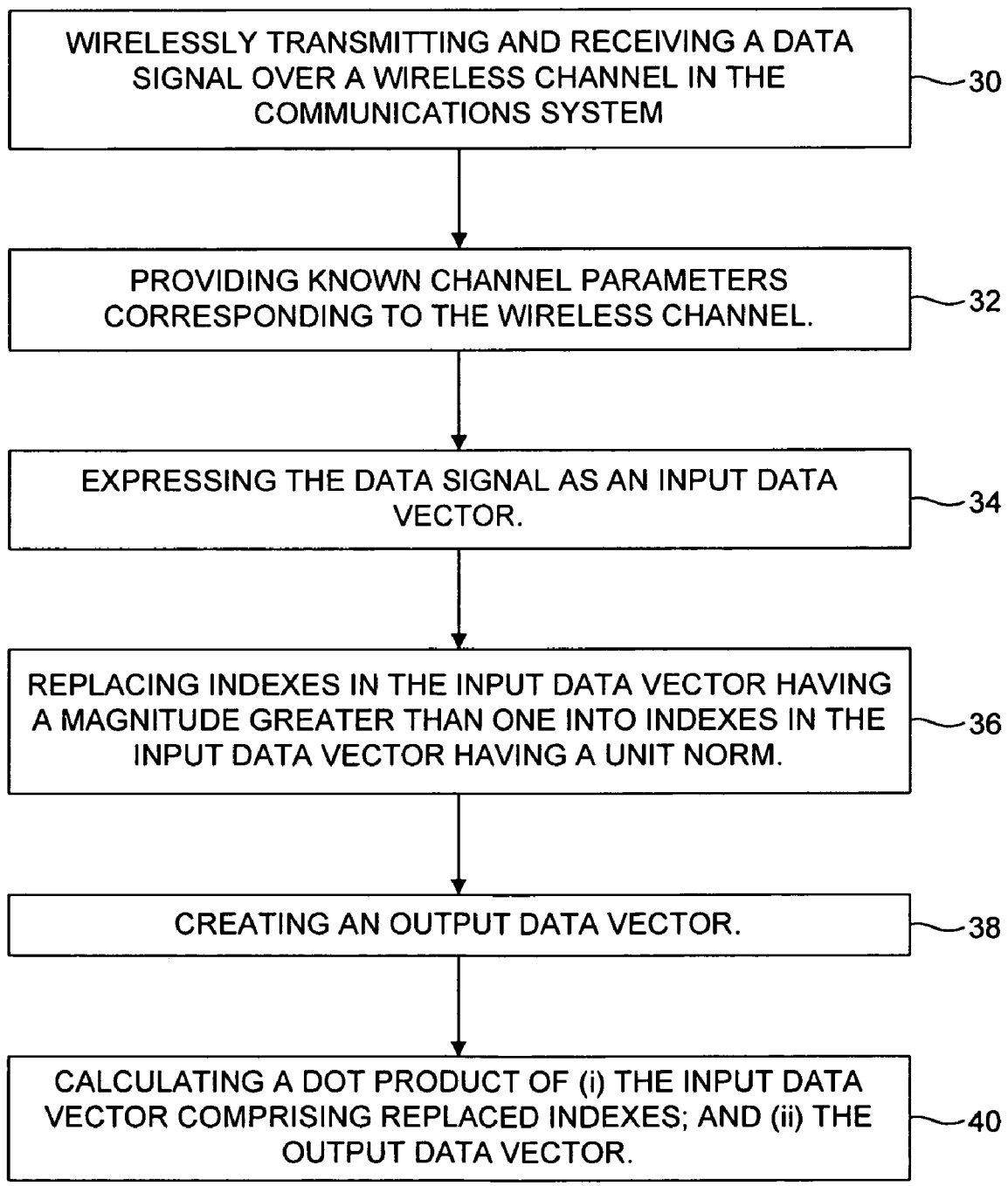
FIG. 1 is a flow diagram illustrating a preferred method according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an equalization technique for OFDM receivers in the presence of ICI. The embodiments herein achieve this by providing a technique for Doppler compensation assuming that the channel parameters are known a priori. Referring now to the drawings, and more particularly to FIGS. 1 through 10, where similar reference characters denote corresponding features consistently throughout the figures, there are shown preferred embodiments.

In the context herein, * denotes the complex conjugate transposition; vectors are defined by lowercase letters, while matrices are given by capital letters; and the operator diag( ) is used to represent the diagonal elements of a matrix into a vector of corresponding dimension. The same notation is used to map a vector into the elements of a diagonal matrix.

FIG. 1 is a flow diagram illustrating a method of enhancing transmitted data signals in a wireless communications system according to an embodiment herein, wherein the method comprises wirelessly transmitting and receiving (30) a data signal over a wireless channel in the communications system; providing (32) known channel parameters corresponding to the wireless channel; expressing (34) the data signal as an input data vector; replacing (36) indexes in the input data vector having a magnitude greater than one into indexes in the input data vector having a unit norm; creating (38) an output data vector; and calculating (40) a dot product of (i) the input data vector comprising replaced indexes; and (ii) the output data vector, wherein the calculating process equalizes the data signal received by a receiver in the presence of Doppler frequency shifts of the data signal.

Preferably, the expressing process (34) comprises expressing the known channel parameters as a first data vector and a second data vector; and setting the input data vector as a ratio of the first data vector to the second data vector. Moreover, the method may further comprise calculating a ratio of the dot product and the first data vector in order to estimate a quality of the transmitted data signal, wherein the quality of the transmitted data signal may comprise a reduced signal to noise ratio in the transmitted data signal. Additionally, the calculating process (40) may comprise performing a FFT of an IFFT of the dot product. The method may further comprise removing ICI from the data signal. Furthermore, the wireless communications system may comprise an OFDM system.

Figure 2:
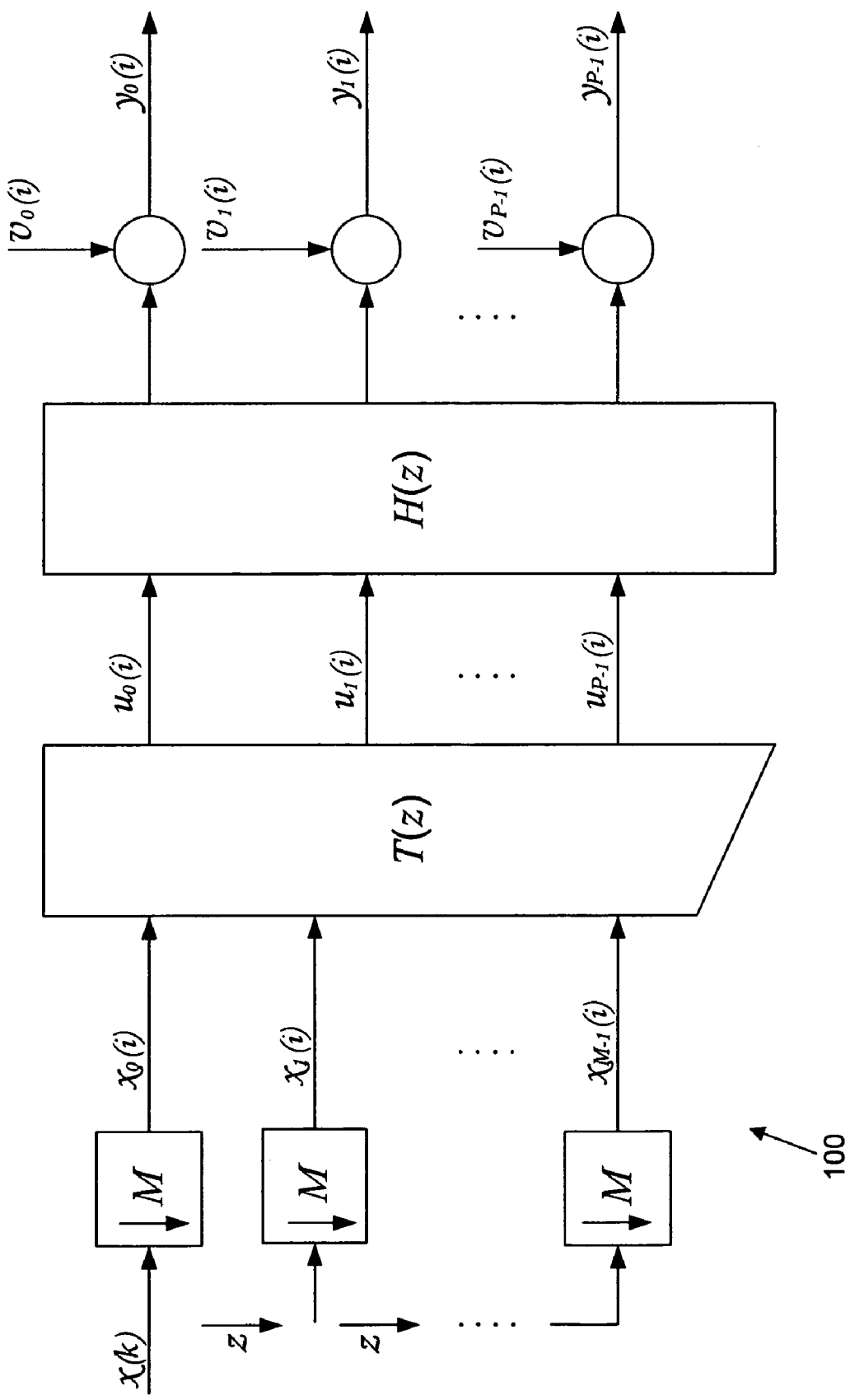
FIG. 2 is a system block diagram illustrating a block precoder transmitter-channel.

FIG. 2 illustrates a discrete-time block transmission model of a baseband communication system 100 using a generic precoder T(z). The input signal is parsed into blocks of M entries denoted by $\{x_m(i)\}$, which are then transmitted through the channel, represented by the pseudocirculant convolution matrix H(z). The ratio P/M, assuming $P \geq M$, is called the "bandwidth expansion factor", and it measures the redundancy per block transmitted serially through the corresponding scalar channel h(n). At the receiver end, the original data rate is restored after some equalization procedure.

Transmitting information redundancy is used to improve system performance when x(n) comes from a finite field, which gives rise to the well-known Block Convolutional Coders. Moreover, this is also the case when the input x(k) arises from a certain symbol constellation so that the complexity of the receiver can be further reduced for detection. This is the case in standard OFDM systems, where by proper choice of the transmit filters, the interblock interference (IBI) of symbols can be eliminated, and the optimal receiver is forced to have a diagonal structure.

Defining the block vectors:

$$x(i) \triangleq [x(iM) \quad x(iM+1) \quad \ldots \quad x(iM+M-1)]^T \quad (1)$$
$$v(i) \triangleq [v(iP) \quad v(iP-1) \quad \ldots \quad v(iP-P+1)]^T$$
$$y(i) \triangleq [y(iP) \quad y(iP-1) \quad \ldots \quad y(iP-P+1)]^T$$

The memory of the resulting block transfer functions $\{T(z), H(z)\}$ is known to depend on the transmitted block length P. By selecting $P \geq N$, where N is the length of the channel impulse response, the simplest case is found to be where T(z) is a memory-less matrix; i.e., T(z)=T, while H(z) becomes a two-tap block transfer function, which can be written as:

$$H(z) = H_0 + zH_1$$

Therefore, in the time domain, the output y(i) can be written as:

$$y(i) = H_0 Tx(i) + H_1 Tx(i+1) + v(i).$$

In other words, the matrix $H_0$ models the ISI of symbols within a block, whereas the matrix $H_1$ models the IBI between two consecutive blocks of data.

In linear based receivers, in order to eliminate IBI, it is sufficient to eliminate the term in $H_1$ in the above equation. Generally, this can be accomplished via two alternative ways by the so-called "overlapp-save" and "overlapp-add" convolution techniques. In the communications art field, these methods are referred to respectively as the "cyclic prefixing" and "zero-padding" forms of including symbol data redundancy in the transmission.

The IBI term can be eliminated by retaining only part of the output vector y(i), which is denoted by y'(i), for simplicity of notation. That is, by choosing the M×P matrix $$R = [\,0_{M,N-1} \quad \overline{R}_{M,P-N+1}\,] \tag{2}$$

$RH_1=0$, so that:

$$\begin{aligned} y'(i) &= Ry(i) \\ &= RH_0Tx(i) + v'(i) \\ &= \overline{R}\overline{H}_0Tx(i) + v'(i) \end{aligned} \tag{3}$$

where $\overline{H}_0$ is given by:

$$\overline{H}_0 = \begin{bmatrix} h(N-1) & h(N-2) & \ldots & h(0) & \ldots & 0 & \ldots & 0 \\ 0 & h(N-1) & \ldots & h(1) & \ldots & & \ldots & 0 \\ \vdots & & \ddots & \ddots & \ddots & \ddots & \ddots & \vdots \\ 0 & & \ldots & 0 & 0 & \ldots & h(N-1) & \ldots & h(0) \end{bmatrix} \tag{4}$$

This procedure has further been called the leading receiver zeros (LZ) method and is the basis for the standard OFDM system.

For an optimal LZ receiver, given the method $y'(i)=\overline{R}\,\overline{H}_0\,T\,x(i)+v'(i)$, the optimal minimum mean square equalizer is the one that replaces $\overline{R}$ by K, the solution to the linear estimation problem:

$$\min_K E\|x(i) - Ky'(i)\|^2$$

which is given by $K_o = R_{xy'} R_{y'}^{-1}$, where $\{R_{xy'}, R_{y'}\}$ denote the correlation and cross-correlation matrices of x and y. Let $H = \overline{R}\,\overline{H}_0 T$, so that $y'(i) = H x(i) + v'(i)$. Then, in terms of this model:

$$\begin{aligned} K_o &= R_x H^*(R_{v'} + H\,R_x H^*)^{-1} \\ &= (R_x^{-1} + H^*\,R_{v'}^{-1} H^*)^{-1} H^*\,R_{v'}^{-1} \end{aligned}$$

Figure 3:
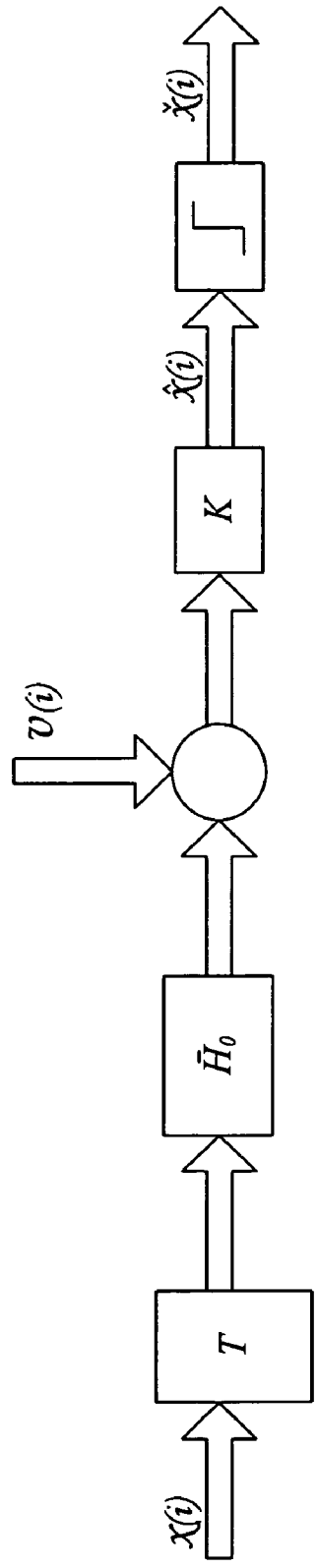
FIG. 3 is a system block diagram illustrating an optimal linear equalization scheme.

FIG. 3 illustrates this optimal equalization scheme by illustrating the corresponding matrices.

The standard OFDM on the other hand takes R=F, which greatly simplifies the linear model. By selecting:

$$T = \begin{bmatrix} I_{P-M\times M} \\ I_M \end{bmatrix} \overline{T} \text{ (cyclic-prefixing)}$$

one gets $y'(i) = \overline{R}\,C\,T\,x(i) + v'(i)$, where now the corresponding circulant matrix C has the form:

$$C = \begin{bmatrix} h(0) & 0 & \ldots & 0 & h(N-1) & \ldots & h(1) \\ h(1) & h(0) & \ldots & & \ddots & \ddots & \vdots \\ \vdots & \ddots & \ddots & \ddots & & \ddots & h(N-1) \\ h(N-1) & \ddots & \ddots & & & \ddots & 0 \\ 0 & \ddots & \ddots & & & \ddots & \vdots \\ \vdots & \ddots & \ddots & & & \ddots & 0 \\ 0 & \ldots & 0 & h(N-1) & \ldots & h(1) & h(0) \end{bmatrix} \tag{5}$$

Again, with the choice $\overline{R}=T^*=F$, one may obtain a diagonal model:

$$y'(i) = \Lambda x(i) + v'(i)$$

where:

$$\begin{aligned} K_o &= R_x \Lambda (R_v + \Lambda\Lambda^*)^{-1} \\ &= (R_x^{-1} + \Lambda^* R_v^{-1} \Lambda)^{-1} \Lambda^* R_v^{-1} \end{aligned}$$

Moreover, by defining $$\lambda \stackrel{\Delta}{=} diag(\Lambda),$$

the following expression is derived:

$$\lambda = \sqrt{M} F^* c^T, \tag{6}$$

where c is the first row of C. Clearly, when $R_x$ and $R_v$ are diagonal, these expressions become much simpler.

With respect to the effect of the carrier offset due to oscillator mismatch, in the presence of a carrier offset, $\Delta\omega$, due to the inaccuracy of the oscillators, the k-th subcarrier signal sampled at $T_s$ appears modulated by a residual carrier $\Delta\omega k T_s$. That is, in practice, the output vector y(i) must be redefined as:

$$y_o(i) \stackrel{\Delta}{=} \tag{7}$$

$$[y(iP)e^{-j\phi(iP-1)} y(iP-2)e^{-j\phi(iP-2)} \ldots y(iP-P+1)e^{-j\phi(iP-P+1)}]^T.$$

where $\phi = 2\pi\epsilon/M$ is written in terms of the normalized frequency offset $\epsilon = \Delta f M T_s$. Let $\overline{y}(i)$ be the OFDM output vector after cyclic prefix removal. It can be written as:

$$\begin{aligned} \overline{y}(i) &= [y(iP-P+M)e^{-j\phi(iP-P+M)} \\ &\quad y(iP-P+M-1)e^{-j\phi(iP-P+M-1)} \ldots \\ &\quad y(iP-P+1)e^{-j\phi(iP-P+1)}]^T \\ &= e^{-j2\pi\epsilon\frac{iP-P+M}{M}} [y(iP+P-1) \ldots \\ &\quad y(iP-P+1)e^{j2\pi\epsilon(M-1)/M}]^T \\ &= e^{-j2\pi\epsilon\frac{iP-P+M}{M}} D y'(i) \\ &= e^{-j2\pi\epsilon\frac{iP-P+M}{M}} DCF^* \tilde{x}(i) + v'(i) \end{aligned} \tag{8}$$

Where:

$$D = \begin{bmatrix} 1 & & & \\ & e^{j2\pi\epsilon 1/M} & & \\ & & \ddots & \\ & & & e^{j2\pi\epsilon(M-1)/M} \end{bmatrix} \tag{9}$$

which results in:

$$y'(i) = e^{j2\pi\varepsilon\frac{-iP+P-M}{M}}(FDF^*)\Lambda x(i) + v'(i) \quad (10)$$

The term $$e^{j2\pi\varepsilon\frac{-iP+P-M}{M}}(FDF^*)$$

is the so-called ICI factor which must be either estimated and cancelled, or reduced by some signal processing technique. In the former case, the problem is that of estimating the carrier offset $\phi$ from the received vector $\bar{y}(i)$; that is:

$$\bar{y}(i) = e^{j2\pi\varepsilon\frac{-iP+P-M}{M}}DF^*\Lambda x(i) + \bar{v}(i). \quad (11)$$

Next, with respect to channel estimation, instead of attempting to obtain the carrier offset separately, its effect shall be considered as part of a channel parameter set. Hence, consider the Taylor expansion:

$$e^{j2\pi k\varepsilon/M} = \sum_{p=0}^{\infty} \frac{(j \cdot 2\pi k\varepsilon/M)^p}{p!}, \quad (12)$$

so that Equation (12) can be written as:

$$y'(i) = e^{j2\pi\varepsilon\frac{-iP+P-M}{M}}\left(\sum_{p=0}^{\infty}(j\,2\pi\varepsilon)^p\underbrace{(FD^{(p)}F^*)}_{\Xi^{(p)}}\Lambda\right)x(i) + v'(i), \quad (13)$$

where:

$$D^{(p)} = \frac{1}{M^p}\text{diag}\{0, \ldots, (M-1)^p\} \quad (14)$$

This is the linear model to be used later for the purpose of equalization. To this end, the model is expressed as a function of the channel parameters to be estimated. Let $$\lambda_p \triangleq \text{diag}\left(e^{j2\pi\varepsilon\frac{-iP+P-M}{M}}(j2\pi\varepsilon)^p\Lambda\right) \text{ and}$$

$$X \triangleq \text{diag}(x(i)).$$

This allows Equation (13) to be written as:

$$y'(i) = [\Xi^{(0)}X \quad \Xi^{(1)}X \quad \ldots \quad \Xi^{(P)}X]\begin{bmatrix}\lambda_0 \\ \lambda_1 \\ \vdots \\ \lambda_{P-1}\end{bmatrix} + v'(i). \quad (15)$$

From this linear description, one could proceed to estimate the channel parameters $\{\lambda_p\}$ using training data, and then estimate useful information based on such estimates. In the context of the embodiments herein, training data is the data that is known at both the transmitter and receiver, so that in Equation (15) the unknown quantity to be estimated is the vector of lambdas. For instance, one can transmit an entire block of known symbols (i.e., training data or pilots). The purpose of the training data is only for estimating the channel, in a "channel estimation step". The "useful" information is the information that is sent and that one wishes to detect at the output, once it is already known what the channel is. In static or very slow varying channel scenarios, one can use a full block for estimating the channel, and later send full blocks of symbols to be detected at the output. In rapidly changing channel environments, however, the transmitted block must contain both training data and useful information. That is, one may allocate a portion of the transmitted data vector for pilots (training) and another portion for the actual information one wants to recover at the output. It is performed this way since the channel is varying so rapidly that channel estimation within every block becomes necessary. In accordance with the embodiments herein, however, a method is provided that assumes that channel parameters (the lambdas) are already known.

The effects of a Doppler shift due to mobility is analyzed by determining an effective technique for combating the ICI due to rapid variations of a mobile channel as discussed in Gorokhov, A. et al., "Robust OFDM Receivers for Dispersive Time-Varying Channels: Equalization and Channel Acquisition," *IEEE Trans. on Communications*, vol.52, no. 4, pp. 572-583, April, 2004, the complete disclosure of which, in its entirety, is herein incorporated by reference. Time variations corrupt the orthogonality of the OFDM subcarriers in a much more severe way, which makes ICI removal a challenging task. The solution to this problem begins form the discrete model, while considering the approach described in the Gorokhov disclosure.

From the previous discussion on the cyclic-prefix based OFDM approach, the output of a static channel is given by:

$$y(i) = C\bar{x}(i) + v(i), \quad (16)$$

where C is the circulant channel matrix defined in Equation (5) and $\bar{x}(i)$ is the vector signal after the Inverse Discrete Fourier Transform (IDFT). Now, in the case of a linear multipath mobile environment, the impulse response of the channel is modeled as a complex Gaussian random process, unlike the determination model assumed previously. The statistics of the channel are described below with respect to the channel estimation phase.

Moreover, due to the mobile velocity, it is preferable to assume that the l-th channel path undergoes a Doppler shift $f_l = f_d \cos\theta_l$, where $f_d$ corresponds to the maximum Doppler shift arriving at a zero angle of incidence. This implies that the circulant matrix in Equation (5) must now be replaced by the following (noncirculant) structure:

$$C_s = \begin{bmatrix} h(0)e^{j2\pi f_0(1-\delta)T} & h(1)e^{j2\pi f_1(1-\delta)T} & \cdots & h(N-1)e^{j2\pi f_{N-1}(1-\delta)T} & 0 & \cdots \\ 0 & \ddots & \ddots & & \ddots & \ddots \ddots \\ \vdots & \ddots & \ddots & & \ddots & \ddots \ddots \\ 0 & \ddots & \ddots & & \ddots & \ddots \ddots \\ h(N-1)e^{j2\pi f_{N-1}(M-N+2-\delta)T} & \ddots & \ddots & & \ddots & \ddots \ddots \\ \vdots & \ddots & \ddots & & \ddots & \ddots \ddots \\ h(1)e^{j2\pi f_1(M-\delta)T} & \cdots & h(N-1)e^{j2\pi f_{N-1}(M-\delta)T} & 0 & \ddots & \cdots \end{bmatrix} \quad (17)$$

The parameter $\delta$ reflects a reconstruction delay introduced in the output Discrete Fourier Transform (DFT), and serves the purpose of minimizing the magnitude of the time-varying channel fluctuations within the OFDM block. In this case, $\delta = (M-1)/2$ can be verified as the optimal choice. Now let $\epsilon_l = f_l/f_s = f_l M T_s$ be the normalized frequency offset corresponding to the l-th path. Then, the terms $e^{j2\pi f_l(k-\delta)T_s}$, for $k=0,\ldots,M-1$, can be written as $e^{j2\pi(k-\delta)\epsilon_l/M}$, which can be expanded via a power series as:

$$e^{j2\pi(k-\delta)\epsilon_l/M} = \sum_{p=0}^{\infty} \frac{(j2\pi(k-\delta)\epsilon_l/M)^p}{p!}. \quad (18)$$

Substituting this expansion into the entries of $C_s$, one may express $C_s$ as:

$$C_s = \sum_{p=0}^{\infty} D^{(p)} C^{(p)} \quad (19)$$

where $D^{(p)}$ is a diagonal given by:

$$D^{(p)} = \frac{1}{M^p} \text{diag}\{-\delta^p, \ldots, \delta^p\} \quad (20)$$

and $C^{(p)}$ are circulant with first row $c_p^T$ given by:

$$c_p^T = \left[h(0)e^{j2\pi f_0 T_s}\frac{(j2\pi f_0/f_s)^p}{p!} \cdots \right. \\ \left. h(N-1)e^{j2\pi f_{N-1}T_s}\frac{(j2\pi f_{N-1}/f_s)^p}{p!}\ 0_{[1,M-N]}\right]. \quad (21)$$

Hence, according to the model of Equation (16), the following are provided:

$$y(i) = \left(\sum_{p=0}^{\infty} D^{(p)} C^{(p)}\right) \bar{x}(i) + v(i) \quad (22)$$
$$= \left(\sum_{p=0}^{\infty} D^{(p)} F^* \Lambda^{(p)} F\right) \bar{x}(i) + v(i).$$

Since $\bar{x}(i) = F^* x(i)$, after applying the DFT to $y(i)$, one may obtain:

$$y'(i) = \left(\sum_{p=0}^{\infty} \underbrace{(FD^{(p)}F^*)}_{\Xi(p)}\Lambda^{(p)}\right) x(i) + v'(i), \text{ or:} \quad (23)$$

$$y'(i) = Ax(i) + v'(i). \quad (24)$$

Equation (24) is the linear model to be used later for the purpose of equalization. To this end, the model is expressed as a function of the channel parameters to be estimated. Let $$\lambda_p \triangleq \text{diag}(\Lambda^{(p)}) \text{ and } X \triangleq \text{diag}(x(i)).$$

This allows Equation (24) to be written as:

$$y'(i) = [\Xi^{(0)}X\ \Xi^{(1)}X\ \cdots\ \Xi^{(P)}X] \begin{bmatrix} \lambda_0 \\ \lambda_1 \\ \vdots \\ \lambda_{P-1} \end{bmatrix} + v'(i). \quad (25)$$

Now, observe that:

$$\lambda_p = \sqrt{M}\bar{F}^* h_p, \quad (26)$$

where $\bar{F}$ is given by the first N rows of the DFT matrix F, and $h_p$ is given by the first N elements of $c_p$ defined in Equation (21). The model in Equation (7) can then be expressed in terms of a reduced parameter set as:

$$y'(i) = \sqrt{M}\underbrace{[\Xi^{(0)}X\bar{F}^*\ \Xi^{(1)}X\bar{F}^*\ \cdots\ \Xi^{(P)}X\bar{F}^*]}_{\Xi} \underbrace{\begin{bmatrix} h_0 \\ h_1 \\ \vdots \\ h_{P-1} \end{bmatrix}}_{w} + v'(i) \text{ or:} \quad (27)$$

$$y'(i) = \Xi w + v'(i) \quad (28)$$

The derivation in the Gorokhov disclosure creates some unnecessary confusion when describing the problem of the procedure for estimating the channel. Accordingly, the derivation described above in accordance with the embodiments herein bypasses the problems in the Gorokhov disclosure with regard to the parameterization of the channel. In this regard, the above model provided by the embodiments herein is obtained via the asymptotic approximation M→∞. In this case, what is defined as U→F is actually an exact relation, regardless of the block size M (here it corresponds to U=F*). Moreover, what is denoted by "a reduced parameterization" H, is nothing but the vector w that contains the channel impulse responses $h_p$, each of length N. Estimating the channel in the time domain and transforming the estimate back to the frequency domain is used in OFDM when the channel is static. Now, since w is a stochastic quantity, its statistics must now be fully characterized.

There exist two standard approaches for estimating a certain variable. The first one assumes that the variable is a deterministic unknown quantity, which is the case when the channel is LTI, that is, when it does not change. The latter defines the so-called "Classical Approach". In a wireless environment, the channel varies, so that it is best to consider the channel as a stochastic variable. Considering it as such, leads to the second well-known approach, known as the "Bayesian Approach", in which case one can incorporate some knowledge on the channel by characterizing its statistical behavior. There are several methods for estimating a variable knowing something about its statistics. In a maximum likelihood (ML) criterion, it is sufficient, to this scenario, to provide only the second order statistics, which means that one should characterize the mean value as well as the convariance matrix of the underlying variable. These two statistics can be obtained from the assumptions on the actual wireless channel model, which is assumed Rayleigh Fading. In this case, the channel vector w in Equation (29) has zero mean, and its covariance matrix defined in Equation (30) can be calculated by considering the power delay profile of the l-th path in Equation (33) and the angle distribution $\theta_l$ after Equation (33). Given these distributions, the covariance is obtained by computing the integral in Equation (34).

With respect to channel estimation, in the context of the embodiments herein, it is assumed that an entire block of symbols is used for pilot information transmission. Extension to a selected number of pilots will be considered later. Thus, according to the Gorokhov disclosure (and considering that the assumptions therein are met), it can be shown that w can be modeled as a zero-mean complex circular Gaussian vector with covariance matrix $\Pi^{-1}$:

$$w \sim N(0, \Pi^{-1}) \quad (29)$$

This means that for a maximum likelihood (ML) criterion optimization, $\Pi^{-1}$, shall be defined more precisely. This quantity can be calculated as:

$$\Pi^{-1} = Eww^* = E\begin{bmatrix} h_0 \\ \vdots \\ h_{P-1} \end{bmatrix}\begin{bmatrix} h_0 \\ \vdots \\ h_{P-1} \end{bmatrix}^*, \quad (30)$$

where, since the channel paths are uncorrelated, its corresponding (p,q) block element is a diagonal matrix, given by:

$$Eh_p h_q^* = \begin{bmatrix} E\frac{(2\pi f_0/f_s)^{p+q}}{p!q!}|h(0)|^2 & & \\ & \frac{(2\pi f_1/f_s)^{p+q}}{p!q!}|h(1)|^2 & \\ & & \ddots \end{bmatrix}. \quad (31)$$

Moreover, because $f_l = f_d \cos \theta_l$, Equation (31) can be written as:

$$Eh_p h_q^* = diag\left(\left[\frac{(2\pi f_d/f_s)^{p+q}}{p!q!}E|h(0)|^2 \right.\right.$$
$$\left.\left. (\cos\theta_l)^{p+q} \frac{(2\pi f_d/f_s)^{p+q}}{p!q!}E|h(1)|^2(\cos\theta_l)^{p+1} \ldots \right]\right). \quad (32)$$

Now, the power delay profile for the l-path is assumed exponentially decaying of the form:

$$\phi_c(\tau) = \frac{e^{-\tau/\tau_0}}{2\pi\tau_0}, \tau > 0, \quad (33)$$

while the angles $\theta_l$ are normally distributed, $\theta_l \in (-\pi, \pi)$. Therefore, the expected value in Equation (32) must then be averaged over these distributions as:

$$E \cdot = \int_0^\infty \frac{e^{-\tau/\tau_0}}{\tau_0} \frac{1}{2\pi}\int_{-\pi}^{\pi} (\cos\theta_l)^{p+q} \quad (34)$$
$$= \begin{cases} \frac{(p+q-1)!!}{(p+q)!!}, & (p+q) \text{ even} \\ 0, & (p+q) \text{ odd} \end{cases}$$

This allows one to correctly conclude that $\Pi^{-1}$ has the block diagonal form $\Pi^{-1} = R_c \otimes I_N$, where:

$$R_c = \begin{cases} \frac{(2\pi f_d/f_s)^{p+q}}{p!q!}\frac{(p+q-1)!!}{(p+q)!!}, & (p+q) \text{ even} \\ 0, & (p+q) \text{ odd}. \end{cases}$$

Finally, using the linear model in Equation (24), the ML estimate of w given y(i) is:

$$\hat{w} = (\sigma_v^2 \Pi + \bar{\Xi}^*\bar{\Xi})^{-1}\bar{\Xi}^*y(i). \quad (35)$$

The complexity of this computation amounts to computing the matrix product $\bar{\Xi}^*y(i)$, while the inverse in Equation (35) can be computed offline. In other words, in the current problem, estimating the channel and the symbols on an ongoing basis is of particular interest; that is, and for this, the received data at a particular time instant is relied upon, as in Equation (35). However, part of Equation (35) does not need to be calculated at the time the new data y(i) is received in Equation (35). This is because the matrix $\bar{\Xi}$ which appears inside the inverse on the right hand side of Equation (35) is already known since the beginning of transmissions (because it depends on X(pilots)), σ and the F matrix which are all known. In this case, the inverse can be computed before any transmission begins, which considerably reduces complexity. Because of the structure of $\bar{\Xi}$, such complexity is given by one M-point IFFT, PM multiplications and P reduced size FFTs.

With respect to the linear equalizer for the OFDM structure, the linear estimation of x(i) can be performed under different criteria. In the context of the embodiments herein, four methods for estimating the block signal are provided, assuming that the channel has been previously estimated by some method.

From the linear model previously described, it is already known that the optimal MMSE estimate of x(i) given y'(i) can be expressed as:

$$\hat{x}(i) = R_x A^* (R_v + A R_x A^*)^{-1} y(i), \quad \text{where:} \tag{36}$$

$$A = \sum_{p=0}^{\infty} \Xi^{(p)} \Lambda^{(p)}. \tag{37}$$

On the other hand, a simple inversion of A would suffice as well.

Figure 4:
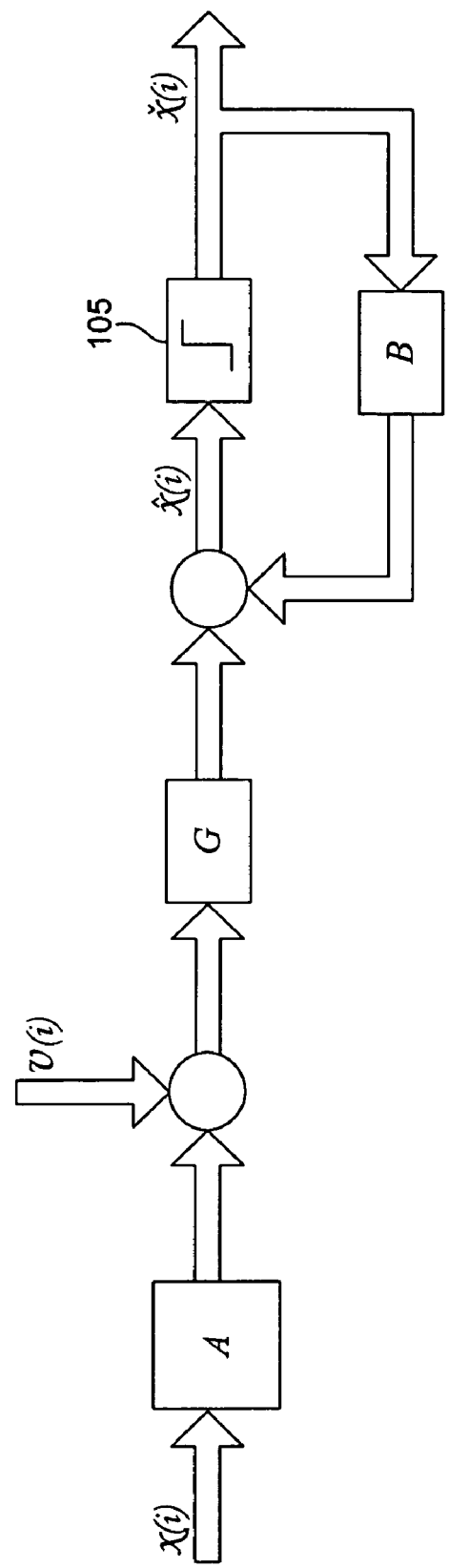
FIG. 4 is a system block diagram illustrating an optimal block DFE scheme.

With respect to the decision feedback equalization for the OFDM structure, FIG. 4 illustrates the optimal block decision feedback equalizer (DFE) scheme represented by the matrices {G,B}, to be optimized in terms of the minimum mean-square error (MMSE). The block decision x̌(i) is defined as:

$$\check{x}(i) \triangleq [\, x(iM + M - 1) \quad x(iM - 2) \quad \ldots \quad x(iM) \,]^T, \tag{38}$$

which is assumed correct, and equal to x(i) in order to make the design of the DFE easier. Because the feedback filter (which is denoted by a matrix B in FIG. 4) has no memory; i.e., B(z)=B, possible errors at the output of the slicer 105 are not propagated throughout successive blocks, but only within each one. Moreover, the structure of feedback filter B must be such that the feedback path is realizable, which is possible by detecting symbols via successive cancellation. More specifically, whenever feedback of a certain quantity is performed, this feedback cannot be made instantaneous. That is, there must be at least a delay of one sample, otherwise the loop cannot be implemented. In other words, in order to compute the subtraction of two entries of a vector at the input of the slicer 105, one must have the output available at that instant. This output is fed back into the feedback filter B. However, such an output only becomes available after the corresponding subtraction of the previous entry has been performed. This implies that B must possess a lower triangular structure, otherwise, this substraction of vectors as a whole is not realizable. For instance, B cannot be a full matrix because this would imply knowledge of entries of the output vector that have not been computer yet. This can be accomplished by restricting B to have a lower triangular structure, in which case the symbols are detected sequentially from the top to the bottom entry of x̌(i). In order to allow for arbitrary ordered decisions, one can simply replace it by:

$$B_{opt} = J^* B J \tag{39}$$

where J is a permutation matrix and B is a strictly lower triangular matrix. For simplicity, it is assumed that J=I, so that the received signal x̂(i) can be expressed as:

$$\hat{x}(i) = Gy(i) - B_{opt} \check{x}(i) \tag{40}$$
$$= Gy(i) - Bx(i)$$

Hence, the minimization problem for the DFE is expressed as:

$$\min_B E\|x(i) + Bx(i) - Gy(i)\|^2. \tag{41}$$

Now, it can be observed that the optimal solution to this problem is no longer the form of the smoothing solution, since B is restricted to be a strictly lower triangular matrix. Hence, denoting by $R_u$ the variance of the augmented input regression vector u, and crossvariance $R_{xu}$, the solution to this problem is given by the well-known Wiener solution to the following problem:

$$\{R_{xu} - [G \ B] R_u\}_{strict.lower} = 0 \tag{42}$$

where:

$$R_u = \begin{bmatrix} R_y & -R_{yx} \\ -R_{xy} & R_x \end{bmatrix} \text{ and } R_{xu} = [R_{xy} \ -R_x],$$

and where $\{\cdot\}_{strict.lower}$ denotes the operator that captures the normal equations corresponding to the lower triangular entries of the argument. The optimal feedforward and feedback matrices are given by:

$$G_o = DL^* A^* R_v^{-1} \tag{43}$$

and:

$$B_o = L^{-1} - I \tag{44}$$

where the factors {L,D} are obtained from the well-known Cholesky decomposition:

$$P \triangleq (R_x^{-1} + A^* R_y^{-1} A)^{-1} = LDL^*. \tag{45}$$

The computational burden involved in computing the exact linear and DFE filters described above turn their implementation into a difficult task. This calls for approximate solutions that hopefully yield computational requirements similar to the ones of the standard static channel OFDM.

The Gorokhov disclosure proposes a two-step procedure in order to cancel the ICI inherent to the problem identified by the embodiments herein. The idea is to first obtain a rough estimate of the transmitted symbol, and then use this estimate to remove the ICI. That is, first retain the diagonal elements of A, and compute ŝ(i)=(diag A)$^{-1}$y. The detected symbol at the output is given by š(i). Then, a better estimate for x(i) can be obtained as:

$$\hat{x}(i) = (\text{diag } A)^{-1} \left( y(i) - F^* \sum_{p=1}^{P} \tilde{D}^{(p)} F \Lambda_p \check{s}(i) \right), \tag{46}$$

where:

$$\tilde{D}^{(p)} = \text{diag}\left\{ \left( \frac{k-\delta}{M} \right)^p - \Gamma_p \right\}_{0 \le k \le M-1} \text{ and}$$

$$\Gamma_p = \frac{1}{M} \sum_{j=1}^{M} \left( \frac{j-\delta}{M} \right)^p.$$

The major problem of such a structure lies in the lack of confidence in the primary estimate š. In other words, since a worst case scenario is of most interest, where the speed of a mobile transmission can reach, for example, 300 km/h (maximum normalized Doppler frequency $\epsilon_{max}=0.25$), the contribution of the off-diagonal terms of A will be rather significant. This means that their effect will not be taken into account when computing š and the primary estimate of the OFDM symbol will be poor.

One possible approach to enhance the DFE performance is to compute an improved first estimate š. This improved estimate is denoted by $š_0$. Next, according to the embodiments herein, an adaptive computation of $š_0$ is provided, using the well-known normalized least mean-square (NLMS) algorithm (or its power of 2 variant for efficient implementation), in order to obtain a more accurate initial estimate for s. The algorithm is provided below:

Initialization $\mu = 1$ $w_{-1} = \hat{s}$ $A_c \triangleq vec(\underbrace{A, A, \ldots, A}_{rtimes})$ $u_i \triangleq A_c(i, :)$ For $i = 0$ to $rM - 1$, repeat:

$e(i) = y_c(i) - u_i w_{i-1}$ $w_i = w_{i-1} + \mu \frac{u_i^*}{\|u_i\|^2} e(i)$ $w_i = \text{slice}(w_i)$ Set $š_0 = w_{rM-1}$ More specifically, starting with the initial condition $w_{-1}=\hat{s}$, first run the NLMS algorithm listed above. Then, replace $š \to š_0$ and use Equation (46) to find $\hat{x}(i)$. Since it is known that the NLMS converges approximately to an exact least-squares solution, it is expected that $š_0$ serves as an improved estimate for $\hat{x}(i)$ after convergence. However, an LMS-type algorithm performs this task at a much slower pace than an exact linear equalizer solution computed via a recursive least-squares (RLS) filter. This further implies that more data is required in order to persistently excite the filter, which, due to the ICI model, is limited to a M×M data matrix. One solution to this problem is to "repeat" the corresponding data matrix once $w_{M-1}$ is obtained via the NLMS. This procedure can be repeated as often as necessary until the filter converges. The initial condition $w_{-1}$ plays a significant role, in the sense that it is preferable to begin the algorithm as close as possible to the true transmitted vector.

Within this method, three facts remain significant for the algorithm performance:
  The adaptive filter convergence can be accelerated by projecting the corresponding weight vector at each iteration i onto the closest point of the underlying symbol constellation.
  More important, the convergence of the algorithm will be highly dependent on the statistical properties of the corresponding input signal, here given by the rows of A. In this sense, the frequency domain nature of these rows has a significant role. However, merely repeating the data matrix a few times is not sufficient in order to guarantee convergence when the input regressors are not taken in the frequency domain.

In order for the algorithm to be useful, a low complex implementation of its defining recursions is preferable. Some savings in complexity can be achieved by noting that the data matrix A has a banded structure, so that only 2N−1 main diagonals can be used to represent its effect. This reduces the number of computations in the NLMS algorithm. However, one must still form the remaining elements of A, which too utilizes additional computational effort.

The adaptive procedure previously described utilizes considerable effort, considering that the input regression vectors need to be formed a priori, from the channel derivatives. In this sense, the original simplified DFE of the Gorokhov disclosure remains less complex.

A simple approximation for the required matrix inversion can be implemented within the same order of complexity of the Gorokhov disclosure, however one that shows superior bit error rate (BER) performance without requiring decision feedback. This is possible by realizing that an exact matrix inversion of a linear model that contains only the first derivative can outperform any of the simplified DFE schemes that use higher order derivatives. Having this fact in mind, consider the linear model:

$y=Ax+v$, which can be written as:

$$y = (\Lambda_0 + FDF^*\Lambda_1)x + v \qquad (47)$$
$$= (I + FDF^*\Lambda_1\Lambda_0^{-1})\Lambda_0 x + v.$$

The desired estimate $\hat{x}$ is given by:

$$\hat{x} = \Lambda_0^{-1}(I + FDF^*\Lambda_1\Lambda_0^{-1})^{-1} y \qquad (48)$$
$$= \Lambda_0^{-1}(I + Q)^{-1} y$$

where $$Q \triangleq FDF^*\Lambda_1\Lambda_0^{-1}.$$

Now, note that when Q is a stable matrix, the inverse in Equation (48) can be written as:

$$(I+Q)^{-1}=I-Q+Q^2-Q^3+Q^4- \qquad (49)$$

so that the infinity product $z=(I+Q)^{-1}y$ can be approximated with a finite number of terms, and computed recursively as:

$$z_m=y-(FDF^*\Lambda\cdot_1\Lambda_0^{-1})z_{m-1}, z_0=y \qquad (50)$$

The estimate of $\hat{x}$ can then be obtained as:

$$\hat{x}=\Lambda_0^{-1}z_{L-1},$$

where L is the number of terms used to approximate Equation (49). In case any entry of $\Lambda_1 \Lambda_0^{-1}$ is not less that one, one could simply replace this entry by one with magnitude one, so that the expansion does not diverge.

Next, it is desirable to determine a minimum probability that matrix Q is stable. By stability, it is meant |Q|<1, where |·| is any matrix norm. Let $\rho$ be an eigenvalue of Q with associated eigenvector q so that $\rho q=Qq$. This allows one to write:

$$|\rho||q| = |FDF^*\Lambda_1\Lambda_0^{-1}q| \qquad (51)$$
$$= |DF^*\Lambda_1\Lambda_0^{-1}q|$$
$$\leq \bar{\delta}|\Lambda_1\Lambda_0^{-1}q| \quad \text{where } \bar{\delta} = |D_1| = \delta/M$$
$$\leq \bar{\delta} \max_k \left|\frac{\lambda_{1,k}}{\lambda_{0,k}}\right| |q|$$

so that:

$$|\rho| \leq \bar{\delta} \max_k \left|\frac{\lambda_{1,k}}{\lambda_{0,k}}\right|. \qquad (52)$$

One can now calculate the probability that the right hand side of Equation (52) is strictly less than unity. That is, it is desirable to compute the probability:

$$P\left(\left|\frac{\lambda_{1,k}}{\lambda_{0,k}}\right| \leq \frac{1}{\bar{\delta}}\right), \forall k \qquad (53)$$

Recalling that the channel coefficients are modeled as independent zero-mean complex circular Gaussian random variables, thus, the goal is to rely on a general expression for the probability density function (PDF) of the magnitude of the ratio between two normally distributed correlated Gaussian variables $\{\lambda_{1,k}, \lambda_{0,k}\}$. Results in this direction were first derived in Wooding, R., "The Multivariate Distribution of Complex Normal Variables," *Biometrika*, vol. 43, pp. 212-215, June 1956, the complete disclosure of which, in its entirty, is herein incorporated by reference, for the case of real-valued ratios, and only recently extended to the case of complex variables as suggested in Pham-Gia, T. et al., "Density of the Ratio of two normal random variables *Tech. Report*; Dong, X. et al., "Symbol Error probability of Two-dimensional signaling in Ricean Fading with Imperfect Channel Estimation," *IEEE Trans. on Vehicular Technology*, vol. 54, no. 2, pp. 535-549, March 2005); and Vorobyob, S. et al., "Robust Iterative Fitting of multilinear models," *IEEE Trans. on Signal Processing*, vol. 53, no. 8, pp. 2678-2689, August 2005, the complete disclosures of which, in their entireties, are herein incorporated by reference.

The following ratio is first defined:

$$Z \triangleq \frac{\lambda_{1,k}}{\lambda_{0,k}} = re^{j\theta}. \qquad (54)$$

From the Dong disclosure using the fact that $\{\lambda_{1,k}, \lambda_{0,k}\}$ are zero-mean, the joint PDF of $\{r, \theta\}$ is given by:

$$f_Z(r,\theta) = \frac{r \det(R)}{\pi(\sigma_{\lambda_{0,k}}^2 r^2 - 2\Re\{\sigma_{\lambda_{0,k}\lambda_{1,k}} e^{j\theta}\}r + \sigma_{\lambda_{1,k}}^2)^2} \qquad (55)$$

where R is given by:

$$R \triangleq \begin{bmatrix} \sigma_{\lambda_{1,k}}^{2\prime} & \sigma_{\lambda_{1,k}\lambda_{0,k}}^{\prime} \\ \sigma_{\lambda_{0,k}\lambda_{1,k}} & \sigma_{\lambda_{0,k}}^2 \end{bmatrix} \qquad (56)$$

Let $f_k$ denote the k-th column of F. Since $\lambda_p = \sqrt{M}F^*h_p$, the entries of R in Equation (56) are given by:

$$\sigma_{\lambda_{0,k}}^2 \triangleq E|\lambda_{0,k}|^2 = Mf_k^*(Eh_0h_0^*)f_k = N \qquad (57)$$
$$\sigma_{\lambda_{1,k}}^2 \triangleq E|\lambda_{1,k}|^2 = Mf_k^*(Eh_1h_1^*)f_k = 2N\pi^2\varepsilon_{\max}^2,$$
$$\sigma_{\lambda_{1,k}\lambda_{0,k}} \triangleq E\lambda_{1,k}\lambda_{0,k}^* = MEh_0h_1^* = 0.$$

where the latter quantities are obtained by virtue of $R_c$. Moreover, in this case $\{\lambda_{1,k}, \lambda_{0,k}\}$ turn out to be uncorrelated so that Equation (55) is no longer dependent on $\theta$. The resulting PDF assumes the form of a real Cauchy density as provided in the Vorobyob disclosure and the probability in Equation (53) is computed as:

$$P\left(\left|\frac{\lambda_{1,k}}{\lambda_{0,k}}\right| \leq \frac{1}{\bar{\delta}}\right) = \int_0^{\frac{1}{\bar{\delta}}} \int_{-\pi}^{\pi} \frac{2\pi N^2 \varepsilon_{\max}^2 r}{(Nr^2 + 2\pi^2 N\varepsilon_{\max}^2)^2} d\theta dr \qquad (58)$$
$$= \frac{1}{1 + 2\pi^2 \bar{\delta}^2 \varepsilon_{\max}^2} \approx \frac{1}{1 + (\pi^2/2)\varepsilon_{\max}^2}$$

Here, choosing the minimum possible value for the reconstruction delay yields the maximum probability that the recursions are stable; that is, $\bar{\delta} = (M-1)/2M \approx \frac{1}{2}$.

As an example, assume a carrier frequency of $f_c = 900$ MHz for an OFDM system transmitting 64 QAM in 2K and 8K modes, which corresponds to M=2048 and M=8192 subcarriers, respectively. The channel bandwidth is 8 MHz, and supposing a vehicle is moving at the speed of 300 km/h, this corresponds to a maximum normalized Doppler frequency of $\varepsilon_{max} = 0.0576$ for the 2K mode and $\varepsilon_{max} = 0.25$ for the 8K mode. Then, the probability of Q being stable is at least:

$$P_{2K}\left(\left|\frac{\lambda_{1,k}}{\lambda_{0,k}}\right| \leq \frac{1}{\bar{\delta}}\right) = 98\% \qquad (59)$$

-continued $$P_{8K}\left(\left|\frac{\lambda_{1,k}}{\lambda_{0,k}}\right| \leq \frac{1}{\delta}\right) = 76\%$$

Figure 5:
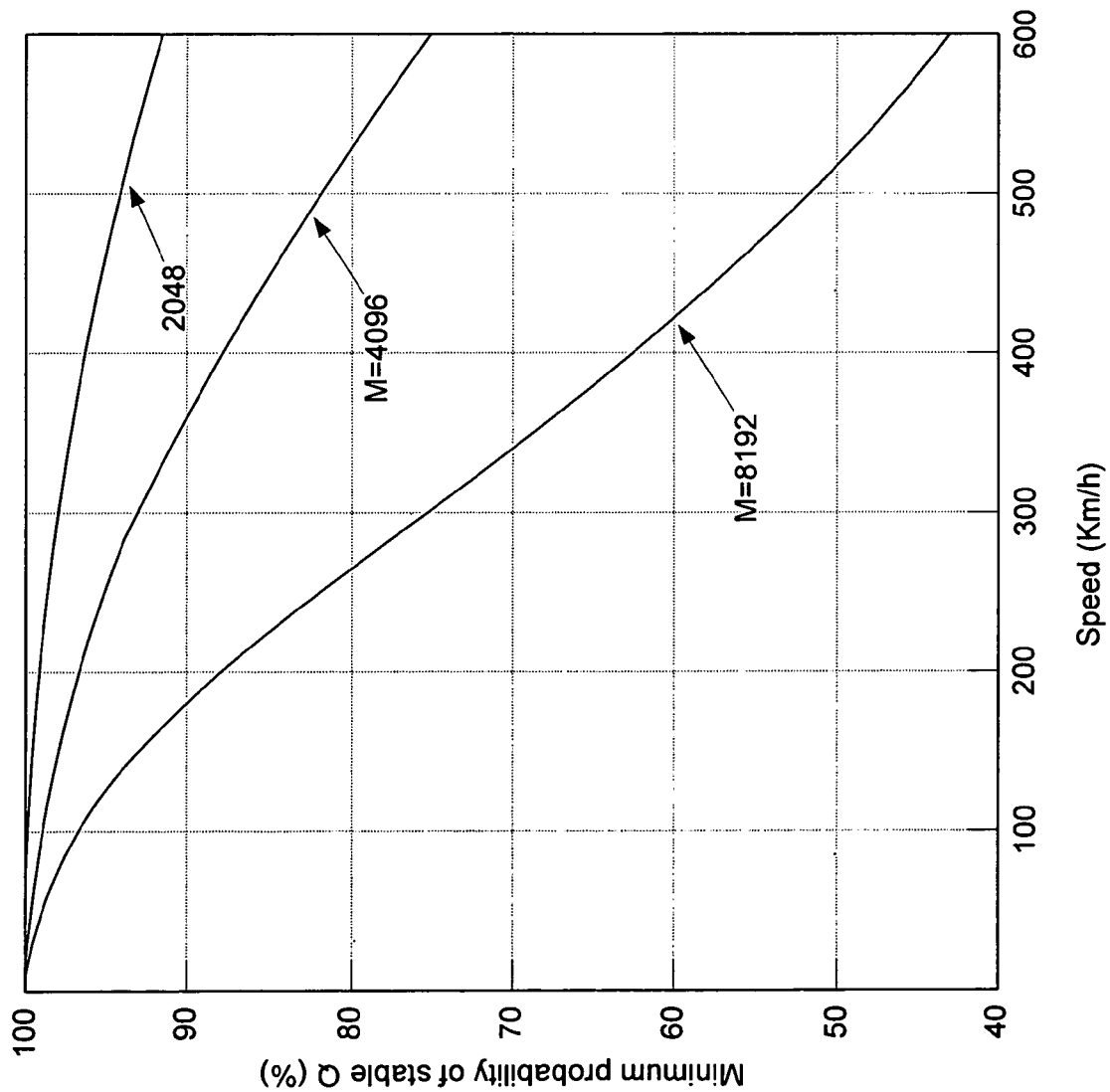
FIG. 5 is a graphical representation illustrating the probability of stable recursion as a function of the mobile speed for multiple subcarriers (M=2048, M=4096, and M=8192) according to an embodiment herein.

FIG. 5 illustrates the lower bound considered for the 2K, 4K, and 8K modes, considering a wide range of the vehicle speed. In addition to the approximation in Equation (49) this is a lower bound due to the worst case scenario where all channel taps undergo a maximum normalized Doppler frequency $\epsilon_{max}$. Moreover, regardless of the true value of the ratio $\lambda_{1,k}/\lambda_{0,k}$, since these quantities will be previously estimated, one can still force $\lambda_{1,k}/\lambda_{0,k} < 1/\delta$ in order to guarantee stability by normalizing the complex quantity $\lambda_{1,k}/\lambda_{0,k}$ so that is has unit norm, and using it in Equation (50) instead of the true value of this ratio.

The product FDF* possess a banded structure, which allows for a fast computation of its product with vectors. As used in the context herein, the banded structure is a term that refers to the fact that the energy of the elements at a finite number of diagonals below and above the main diagonal of a matrix is much higher that the remaining diagonals. That is, the energy is concentrated within a certain "band" around the main diagonal so that the elements of the other entries can be zeroed out. Moreover, the corners of such a circulant matrix also possess high energy, but in a practical OFDM application, they can be "cut off" because non-active carriers are sent within the data block. That is, the first and last, say, k entries of the input blocks are zeros, so that they will cancel the effect of the corners of the circulant matrix.

Figure 6:
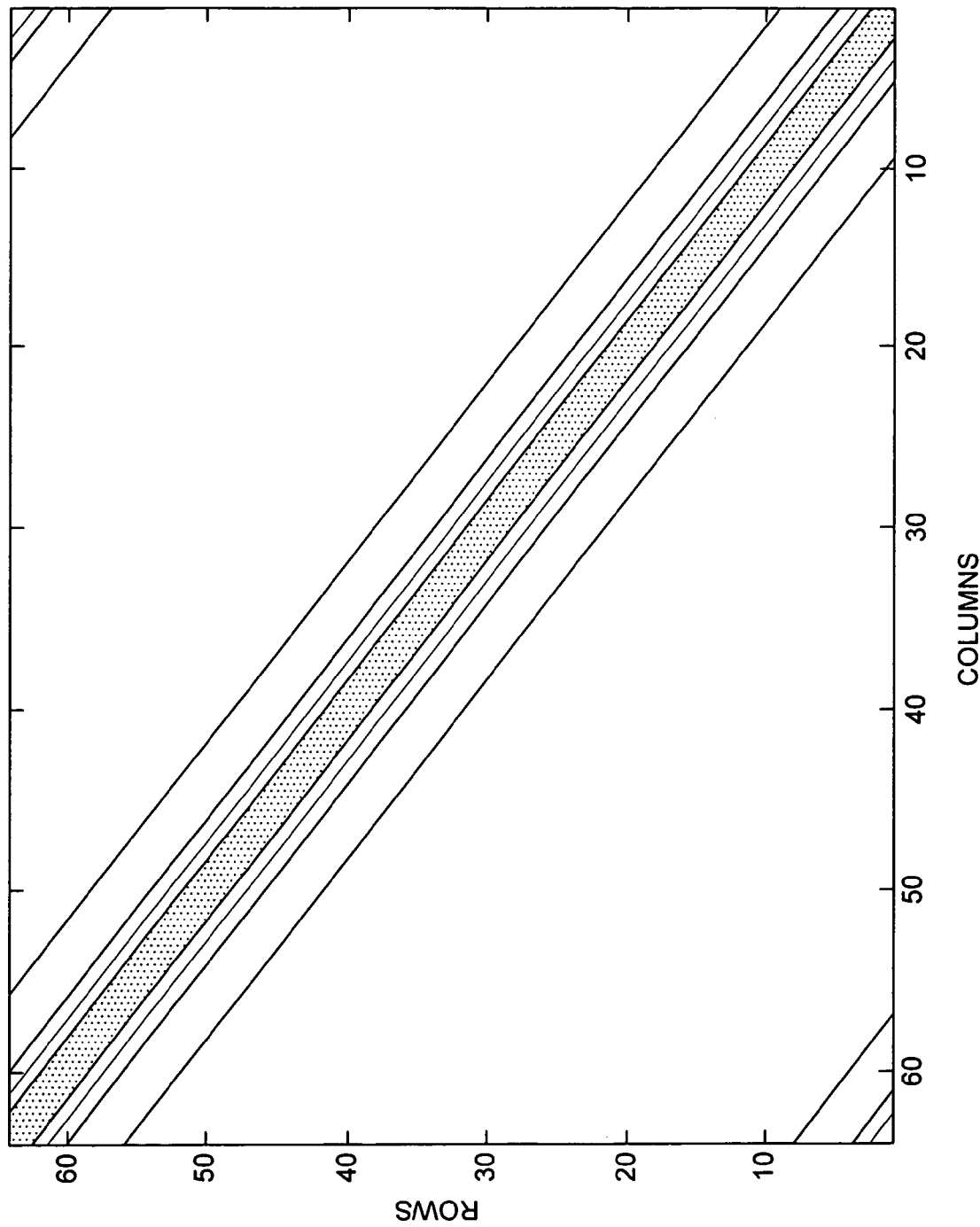
FIG. 6 is a graphical representation illustrating the magnitude of the elements of a banded structure according to an embodiment herein.

FIG. 6 illustrates the magnitude of the elements of FDF*, when N=10. It is verified that, in general, when M<<N, only 2×N−1 diagnoals (N above and N below the main diagonal) are sufficient to represent its effect. More specifically, FIG. 6 refers to the structure of a matrix of ICI energy, when the energy of each element is viewed entrywise. In other words, FIG. 6 illustrates a matrix that shows the energy concentrated around the main diagonal and some energy at the corners. For this particular example, it is a 64×64 size ICI matrix.

Moreover, this complexity can be further reduced if one realizes that a particular symmetry on D yields a circulant matrix FDF* that is composed by a purely imaginary part, in addition to a fixed real decaying component (DC). This is achieved by selecting $\delta = M/2$, instead of $\delta = (M-1)/2$, which implies negligible increase in ICI energy. The probability of a stable Q also remains unchanged. In this case:

$$FDF^* = -\frac{1}{2M} ll^T + Ej$$

where l is a column vector consisting of all ones, and E is a real circulant matrix. Therefore, multiplication of FDF* by a vector requires only real multiplications.

Next, a description of the simulations to test the validity of the embodiments herein is described. The performance of several equalizer structures under an exact modeling scenario are compared. This is accomplished by generating the exact leakage plus channel effect and will provide an upper bound on what to expect from the structure of the Gorokhov disclosure when compared to optimal block equalizer structures. The comparison is made on the following basis:

Optimal block DFE;

Simplified DFE scheme of the Gorokhov disclosure;

Improved simplified DFE provided by the embodiments herein; and

Approximate matrix inversion method provided by the embodiments herein.

Figure 7:
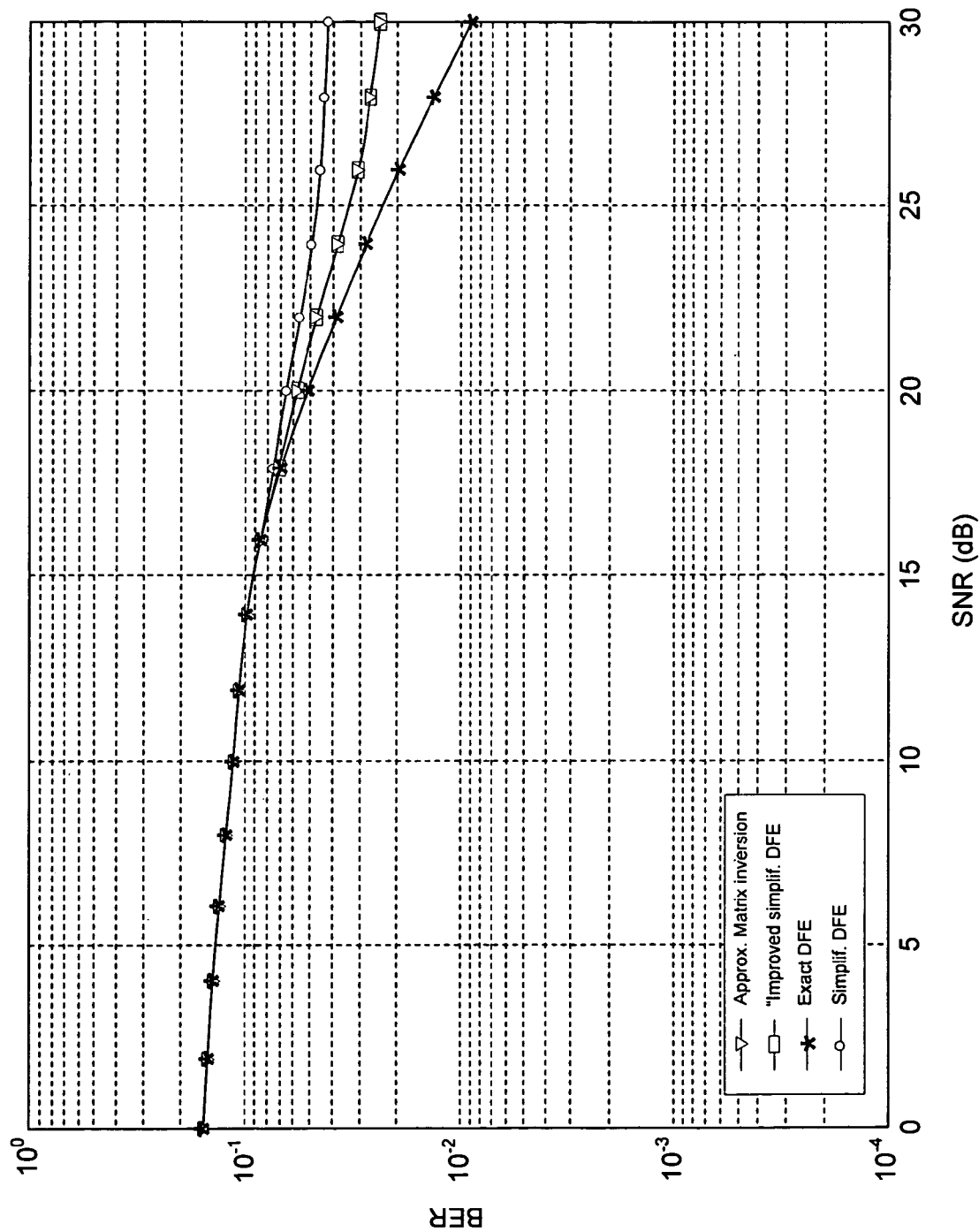
FIG. 7 is a graphical representation illustrating the approximate matrix inversion for 64 subcarriers and a N=10 tap channel according to an embodiment herein.
Figure 8:
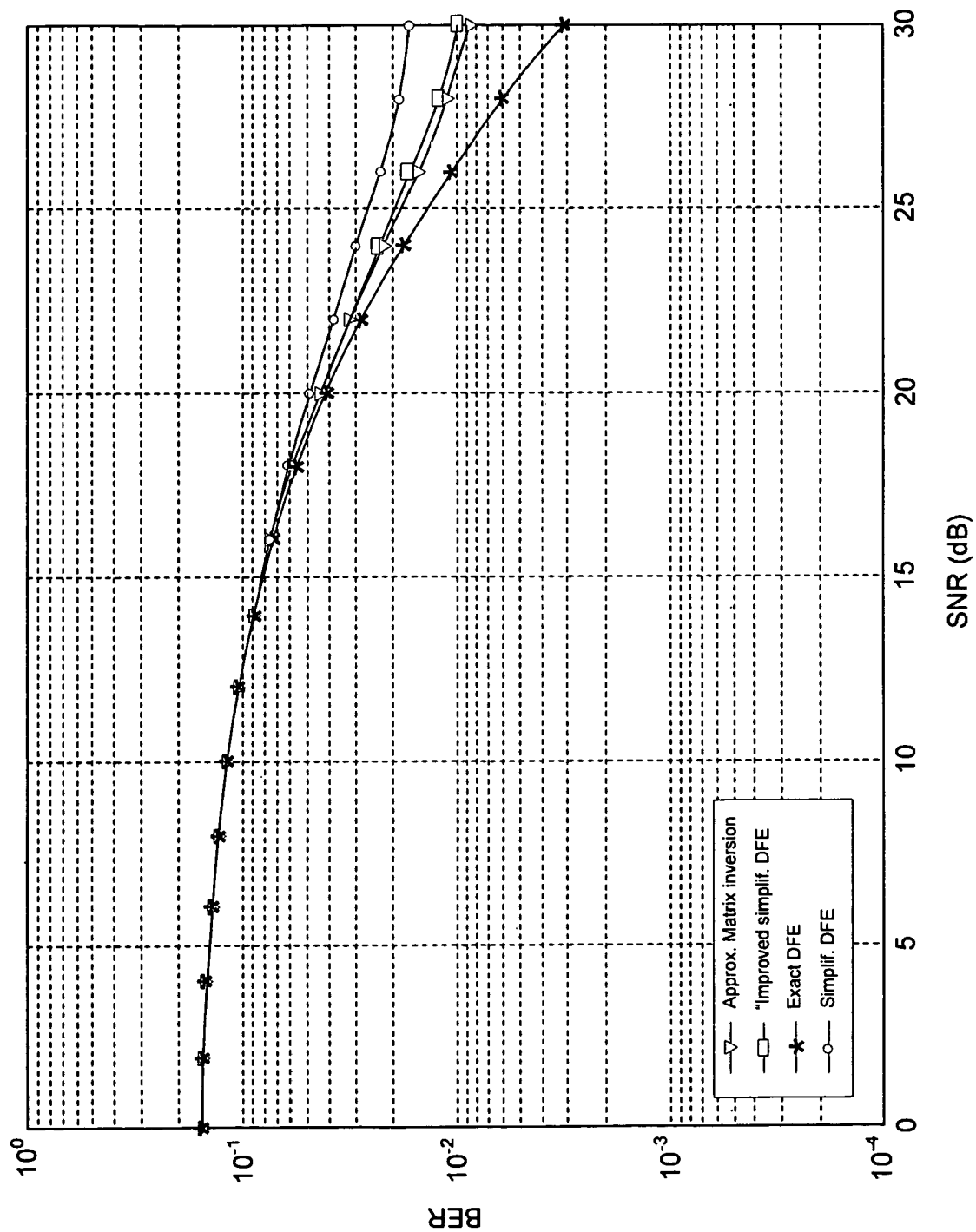
FIG. 8 is a graphical representation illustrating the approximate matrix inversion for 64 subcarriers and a N=30 tap channel according to an embodiment herein.

The channels are generated at random with Doppler frequencies associated randomly to each channel coefficient (channel tap). Furthermore, a few channel coefficients are retained at the maximum normalized Doppler frequency of $\epsilon_{max}=0.2$. The block size is fixed to M=64 and the constellation transmitted is 64 QAM. FIGS. 7 and 8 show the BER performance of the approximate matrix inversion against the previous approaches. As a basis for comparison, the number of derivatives used in the simplified DFE approaches is selected to be equal to the number of terms used in the approximation of Equation (49) (in the example, P=3). This allows one to compare their performance for similar computational requirements. One may observe that the matrix inversion method provided by the embodiments herein that uses one channel derivative yields superior performance than the approximate DFE solutions using higher order derivatives. No rough estimate for the input becomes necessary, which makes the method provided by the embodiments herein more reliable than the simplified DFE solutions.

Accordingly, several methods for removing the ICI resulting from mobility in OFDM systems are investigated. In all schemes, it is assumed that the channel derivatives have been previously estimated. The exact block DEF scheme is shown to be the most accurate, at the expense of an enormous amount of complexity due to the unstructured DFE matrices. The simplified DFE proposed in the Gorokhov disclosure provides fair savings in complexity compared to the exact DFE, but it can still suffer from low accuracy in the case where the mobile device reaches high speeds. Such low accuracy is mainly due to the first rough estimate obtained for the transmitted block. As an alternative to improve this initial estimate, the embodiment herein provide an adaptive estimation of the symbol based on a simple NLMS recursion, also combined with the symbol projection onto the constellation points. This can be a robust technique against imperfections in the linear model. Moreover, convergence in this case is dependent on the statistics of the data matrix, which may vary from one channel to another. Accordingly, the embodiments herein provide a fast approximate matrix inversion method that yields superior performance than all previous methods within the same complexity requirements of the Gorokhov disclosure.

The techniques provided by the embodiments herein may be implemented on an integrated circuit chip (not shown) and may be used in digital video broadcast systems for handheld devices, and implemented in the baseband chip sets support standards such as DVB-H, ISD-T, DMB, and MediaFlo™, for example. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabrication in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form including both hardware and software elements. The software embodiments include, but is not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
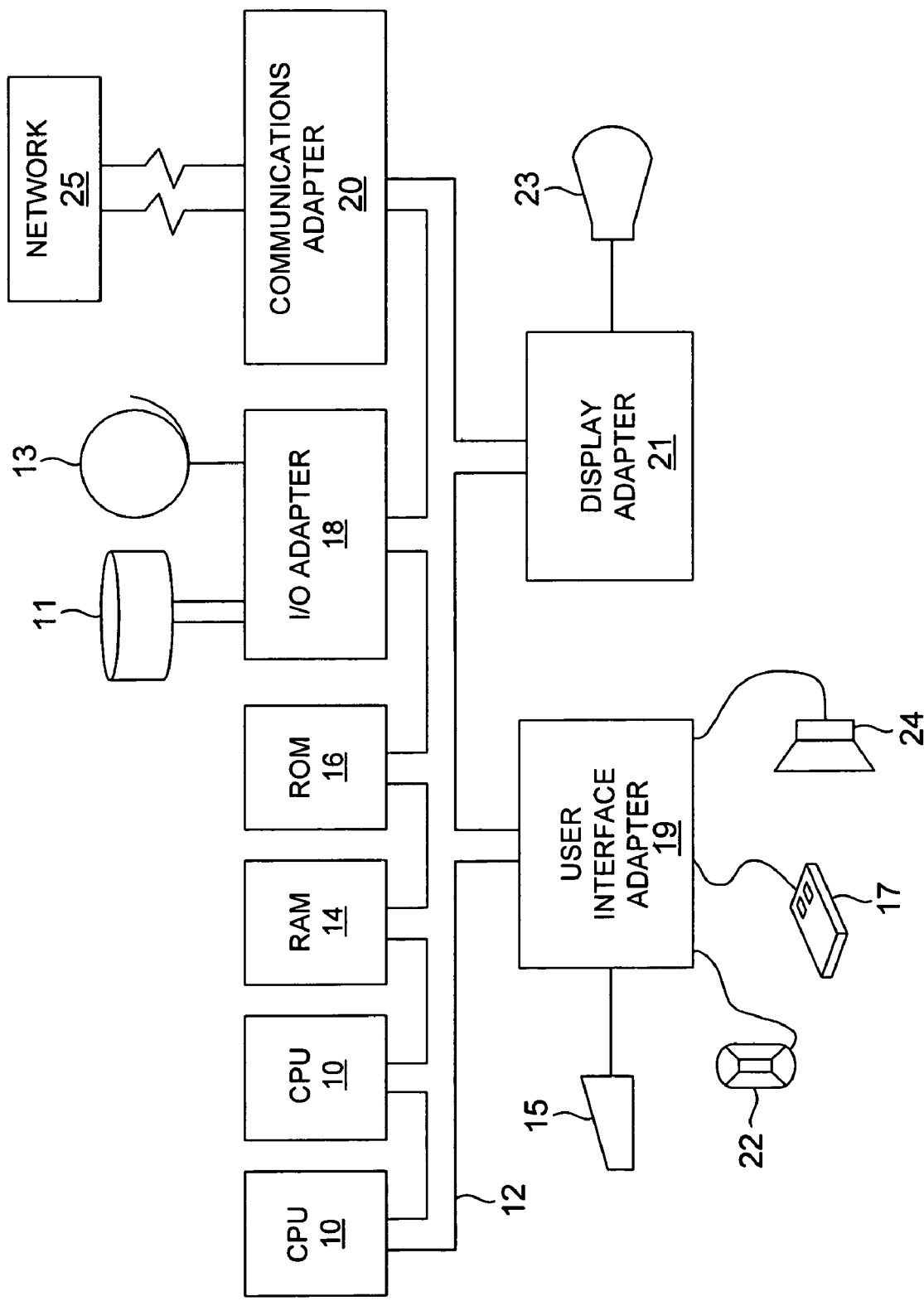
FIG. 9 illustrates a computer system diagram according to an embodiment herein.

A representative hardware environment for practicing the embodiments herein is depicted in FIG. 9. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a RAM 14, ROM 16, and an I/O adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 10:
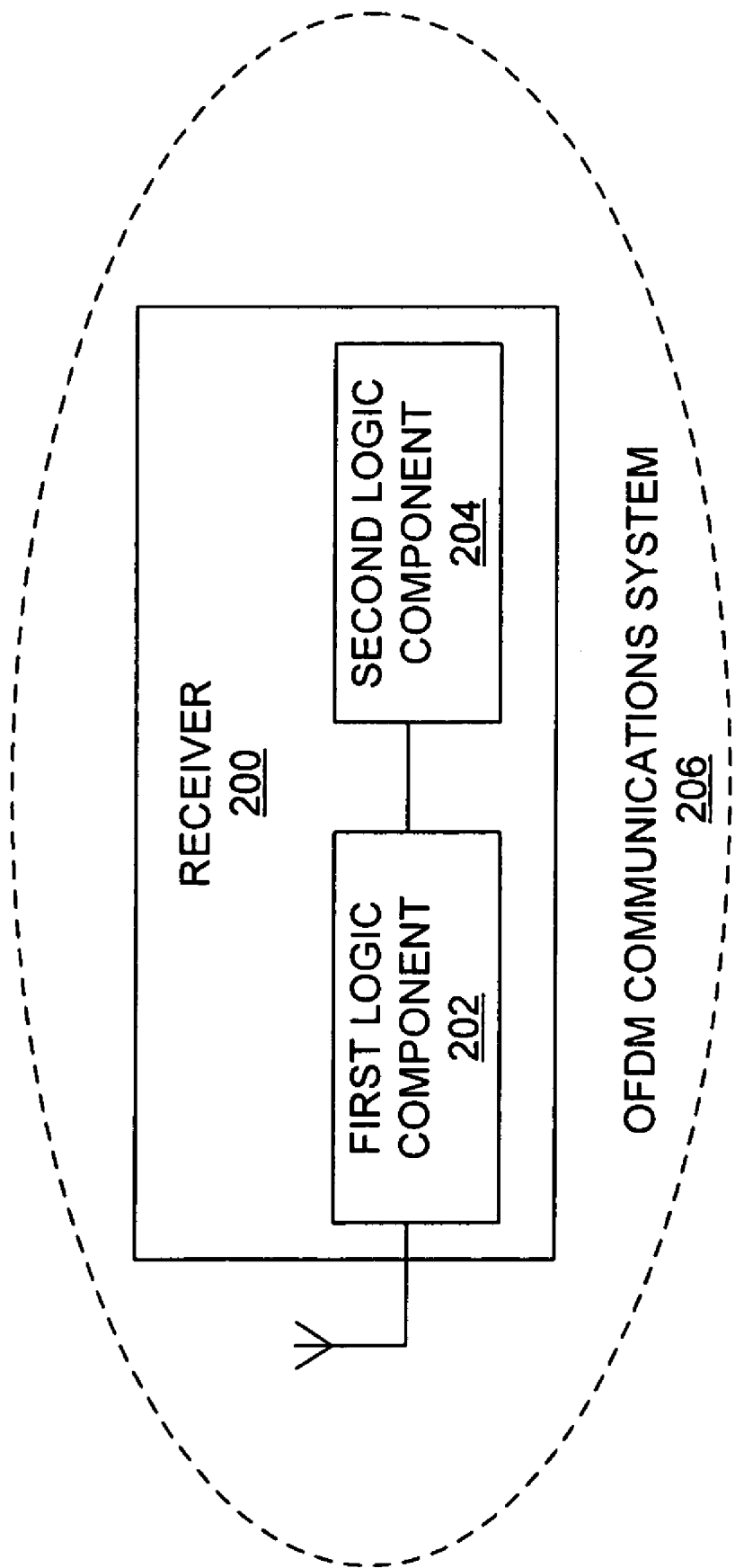
FIG. 10 illustrates a receiver according to an embodiment herein.

FIG. 10, with reference to FIGS. 1 through 9, illustrates a diagram of a receiver 200 that is adapted to enhance transmitted data signals according to an embodiment herein, whereby the receiver 200 comprises a first logic component 202 adapted to receive a data signal over a wireless channel in a wireless OFDM communications system 206, wherein the wireless channel comprises channel parameters that are known at the time of reception of the data signal; and a second logic component 204 coupled to the first logic component 202 and adapted to equalize the data signal received by the first logic component 202 in the presence of Doppler frequency shifts of the data signal, wherein the equalizing of the data signal occurs by expressing the data signal as an input data vector; replacing indexes in the input data vector having a magnitude greater than one into indexes in the input data vector having a unit norm; creating an output data vector; and calculating a dot product of (i) the input data vector comprising replaced indexes; and (ii) the output data vector.

Preferably, in the equalizing of the data signal, the expressing process comprises expressing the known channel parameters as a first data vector and a second data vector; and setting the input data vector as a ratio of the first data vector to the second data vector. Preferably, the equalizing of the data signal further occurs by calculating a ratio of the dot product and the first data vector in order to estimate a quality of the transmitted data signal. Additionally, the quality of the transmitted data signal may comprise a reduced signal to noise ratio in the transmitted data signal. Furthermore, in the equalizing of the data signal, the calculating process preferably comprises performing a FFT of an IFFT of the dot product. Moreover, the second logic component 204 may be adapted to remove ICI from the data signal.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of enhancing transmitted data signals in a wireless communications system, said method comprising:

wirelessly transmitting and receiving a data signal over a wireless channel in said communications system;

providing known channel parameters corresponding to said wireless channel;

expressing said data signal as an input data vector;

replacing indexes in said input vector having a magnitude greater than one into indexes in said input data vector having a unit norm;

creating an output data vector; and calculating a dot product of:

said input data vector comprising replaced indexes; and said output data vector, wherein the calculating process equalizes said data signal received by a receiver in the presence of Doppler frequency shifts of said data signal.

2. The method of claim 1, wherein the expressing process comprises:
 expressing said known channel parameters as a first data vector and a second data vector; and
 setting said input data vector as a ratio of said first data vector to said second data vector.

3. The method of claim 2, further comprising calculating a ratio of said dot product and said first data vector in order to estimate a quality of the transmitted data signal.

4. The method of claim 3, wherein said quality of the transmitted data signal comprises a reduced signal to noise ratio in said transmitted data signal.

5. The method of claim 1, wherein the calculating process comprises performing a fast fourier transform (FFT) of an inverse fast fourier transform (IFFT) of said dot product.

6. The method of claim 1, further comprising removing intercarrier interference (ICI) from said data signal.

7. The method of claim 1, wherein said wireless communications system comprises an orthogonal-frequency-division-multiplex (OFDM) system.

8. A program storage device readable by computer, tangibly embodying a program of instructions executable by said computer to perform a method of enhancing transmitted data signals in a wireless communications system, said method comprising:
 wirelessly transmitting and receiving a data signal over a wireless channel in said communications system;
 providing known channel parameters corresponding to said wireless channel;
 expressing said data signal as an input data vector;
 replacing indexes in said input data vector having a magnitude greater than one into indexes in said input data vector having a unit norm;
 creating an output data vector; and
 calculating a dot product of:
  said input data vector comprising replaced indexes; and
  said output data vector,
 wherein the calculating process equalizes said data signal received by a receiver in the presence of Doppler frequency shifts of said data signal.

9. The program storage device of claim 8, wherein in said method, the expressing process comprises:
 expressing said known channel parameters as a first data vector and a second data vector; and
 setting said input data vector as a ratio of said first data vector to said second data vector.

10. The program storage device of claim 9, wherein said method further comprises calculating a ratio of said dot product and said first data vector in order to estimate a quality of the transmitted data signal.

11. The program storage device of claim 10, wherein said quality of the transmitted data signal comprises a reduced signal to noise ratio in said transmitted data signal.

12. The program storage device of claim 8, wherein in said method, the calculating process comprises performing a fast fourier transform (FFT) of an inverse fast fourier transform (IFFT) of said dot product.

13. The program storage device of claim 8, wherein said method further comprises removing intercarrier interference (ICI) from said data signal.

14. The program storage device of claim 8, wherein said wireless communication system comprises an orthogonal-frequency-division-multiplex (OFDM) system.

15. A receiver adapted to enhance transmitted data signals, said receiver comprising:
 a first logic component adapted to receive a data signal over a wireless channel in a wireless orthogonal-frequency-division-multiplex (OFDM) communications system, wherein said wireless channel comprises channel parameters that are known at the time of reception of said data signal; and
 a second logic component coupled to said first logic component and adapted to equalize said data signal received by said first logic component in the presence of Doppler frequency shifts of said data signal, wherein the equalizing of said data signal occurs by:
  expressing said data signal as an input data vector;
  replacing indexes in said input data vector having a magnitude greater than one into indexes in said input data vector having a unit norm;
  creating an output data vector; and
  calculating a dot product of:
   said input data vector comprising replaced indexes; and
   said output data vector.

16. The receiver of claim 15, wherein in said equalizing of said data signal, the expressing process comprises:
 expressing said known channel parameters as a first data vector and a second data vector; and
 setting said input data vector as a ratio of said first data vector to said second data vector.

17. The receiver of claim 16, wherein said equalizing of said data signal further occurs by calculating a ratio of said dot product and said first data vector in order to estimate a quality of the transmitted data signal.

18. The receiver of claim 17, wherein said quality of the transmitted data signal comprises a reduced signal to noise ratio in said transmitted data signal.

19. The receiver of claim 15, wherein in said equalizing of said data signal, the calculating process comprises performing a fast fourier transform (FFT) of an inverse fast fourier transform (IFFT) of said dot product.

20. The receiver of claim 15, wherein said second logic component is adapted to remove intercarrier interference (ICI) from said data signal.

* * * * *